(12) United States Patent
Aylesworth

(10) Patent No.: US 10,038,331 B1
(45) Date of Patent: Jul. 31, 2018

(54) PRO UNIT TO CONTINUOUSLY RECHARGE THE BATTERY OF AN ELECTRIC CONVEYANCE

(71) Applicant: Terrence W. Aylesworth, Algonquin, IL (US)

(72) Inventor: Terrence W. Aylesworth, Algonquin, IL (US)

(*) Notice: Subject to any disclaimer, the term of this patent is extended or adjusted under 35 U.S.C. 154(b) by 320 days.

(21) Appl. No.: 14/544,280

(22) Filed: Dec. 18, 2014

(51) Int. Cl.
*H02J 7/00* (2006.01)
*B01D 61/00* (2006.01)
*F03G 7/00* (2006.01)
*H01M 8/22* (2006.01)

(52) U.S. Cl.
CPC .......... *H02J 7/007* (2013.01); *B01D 61/002* (2013.01); *B01D 61/005* (2013.01); *F03G 7/005* (2013.01); *H01M 8/22* (2013.01); *H01M 2250/20* (2013.01); *Y02E 10/20* (2013.01)

(58) Field of Classification Search
CPC ..... H02J 7/007; B01D 61/005; B01D 61/002; F03G 7/005; H01M 8/22; H01M 2250/20; Y02E 10/20
USPC ..... 60/649, 673, 698; 290/1 R, 7; 210/257.2
See application file for complete search history.

(56) References Cited

U.S. PATENT DOCUMENTS

| | | | |
|---|---|---|---|
| 2,116,920 A | 5/1936 | Wickenden | |
| 3,171,799 A | 3/1965 | Batchelder | |
| 4,193,267 A * | 3/1980 | Loeb | H01M 8/227 290/1 R |
| 4,193,367 A | 3/1980 | Loeb | |
| 7,871,522 B2 | 1/2011 | Stover et al. | |
| 8,197,693 B2 | 6/2012 | Al-Jlil | |
| 8,545,701 B2 * | 10/2013 | Kelada | F03G 7/005 210/321.66 |
| 9,115,701 B2 * | 8/2015 | McGinnis | F03G 7/005 |
| 9,334,748 B1 * | 5/2016 | Aylesworth | C02F 1/442 |
| 9,393,525 B2 * | 7/2016 | Moody | B01D 61/002 |
| 2007/0278153 A1 | 12/2007 | Oriard et al. | |
| 2010/0051557 A1 | 3/2010 | Elemad et al. | |

OTHER PUBLICATIONS

The van't Hoff Factor, http://www.kentchemistry.com/links/math/vant%20hoff.htm.

(Continued)

*Primary Examiner* — Hoang Nguyen
(74) *Attorney, Agent, or Firm* — Philip H. Kier; David A. Gottardo

(57) ABSTRACT

This invention is an onboard pressure retarded osmosis (PRO) unit for charging or recharging the battery of an electric conveyance or for feeding the conveyance's motor directly. The PRO unit exploits the combined use of osmotic pressure, a water-submerged hollow fiber membrane system, a concentrated aqueous solution of superparamagnetic nanoparticles (a ferrofluid) as a draw solution, and a solenoid-type permanent magnetic field, to create a high pressure water flow that acts upon one or more hydroturbine generators to produce electricity. After the pressurized water acts upon the hydroturbine generators, it is returned to the feed side of the membrane system to once again become permeate, in effect making the entire system a closed loop, continuously re-circulating process. The membrane cells may be heated to increase power density.

7 Claims, 4 Drawing Sheets

(56) References Cited

OTHER PUBLICATIONS

Ge, Q.C, Hydrophilic Superparamagnetic Nanoparticles: Synthesis, Characterization, and Performance in Forward Osmosis Processes, Ind.Eng. Chem. Res. 2011, 50, 382-388.
Osmosis, Georgia State University, http://hyperphysics.phy-astr.gsu.edu/hbase/kinetic/diffus.html.
Cath, T.Z. Forward Osmosis, Principles, Applications, and Recent Developments, J. Membrane Sciences, 2006, 281,70-87, Elvesier.
Latorre, M., et al, Application of Magnetic Nanoparticles in Medicine: Magnetic Fluid Hyperthermia, Puerto Rico Health Science Journal, vol. 28, 3, Sep. 2009.
Kim, Y.C et al Potential of osmotic power generation by pressure retarded osmosis using seawater as feed solution: Analysis and experiments, J. Membrane Sciences, 2013, 429.

\* cited by examiner

PRO UNIT TO CONTINUOUSLY RECHARGE THE BATTERY OF AN ELECTRIC CONVEYANCE

BACKGROUND

The invention relates to the use of pressure retarded osmosis (PRO) to provide direct current electricity (DC) to continuously charge the battery of an electrically-powered vehicle (EV), or other mobile electric conveyances such as a railroad car, a battery powered electric aircraft, or a submarine. Thus a PRO-Electric Hybrid is an autonomously powered electric vehicle or machine that would otherwise need to be plugged into an electric charger powered by the electrical grid. The term hybrid as used in this document refers to the combined use of two separate technologies, a power production device (a PRO Unit) and either a battery or a capacitor device. More particularly, it relates to a PRO unit that exploits the combined use of osmotic pressure, a water-submerged hollow fiber membrane system, a concentrated aqueous solution of superparamagnetic nanoparticles (a ferrofluid) as a draw solute, and a solenoid-type permanent magnetic field to maintain the position of the ferrofluid within the hollow fiber membrane strands, to create a high pressure water flow that acts upon one or more hydroturbine generators to produce electricity. After the pressurized water acts upon the hydroturbine, it is returned to the feed side of the membrane system to once again become permeate, in effect making the entire system a closed loop, continuously re-circulating process.

Osmosis is the natural, universal and biologically ubiquitous movement of a solvent, such as water, through a selectively semi-permeable membrane from a region of low solute concentration solution to a region of comparably high solute concentration solution. The selectivity of the membrane allows for the passage of the solvent while preventing the passage of larger solute molecules through the relatively smaller membrane pores. The natural passage of water through a membrane is driven by the difference in the solute concentrations on either side of the membrane. The larger the difference between the solute concentrations, the greater the driving force of the solvent to permeate the membrane. In other words and in accordance with the second law of thermodynamics, each of the solutions separated by the semi-permeable membrane seeks an equivalent solute concentration. If the membrane contains pores of a size that prevents the passage of solute molecules or particles, (solute particles refer to superparamagnetic nanoparticles in this invention), and only allow for passage of the solvent, then the solvent (the pure water in this invention) will permeate across the membrane according to the osmotic pressure that is proportional to the two different solution concentrations. If two differing concentration solutions are separated by a semi-permeable membrane, the solvent of the lower concentration solution will pass the membrane to dilute the higher concentration solution, until the concentrations of the two solutions are equal. This driving force is known as osmotic pressure. When resistive forces are applied to this osmotic force, the result is referred to the net osmotic driving force. Since this resistive force retards the original osmotic pressure, it is called pressure retarded osmosis (PRO). This resistive force can be the performance of work, such as action upon a hydroturbine generator to create electricity.

The relationship between the concentration of superparamagnetic nanoparticles on the draw solution side of the membrane, the concentration of the solute on the feed side of the membrane, and the osmotic pressure of permeate water, is of key importance. The higher the difference between the solution concentrations, the higher the osmotic pressure, and the higher the resulting permeate flux rate. The higher the permeate flux rate acting upon the hydroturbine, the higher the electrical generation potential.

The general equation describing water flux permeating a membrane in a PRO system is known as the Morse Equation. Jacobus Henricus van't Hoff (30 Aug. 1852-1 Mar. 1911) first proposed a formula for calculating osmotic pressure for which he was awarded the inaugural Nobel Prize in Chemistry in 1901. This formula was later improved upon by Harmon Northrop Morse (Oct. 15, 1848-Sep. 8, 1920). The current formula is known as the Morse Equation, and is defined as:

$$J_W = A(\sigma \Delta \pi - \Delta P), \text{ where}$$

$J_W$ is the water flux,
A is the water permeability constant of the membrane
σ is the reflection coefficient
Δπ is the osmotic pressure differential
ΔP is the applied pressure.
The osmotic pressure, π=iMRT, where
i is the dissociation factor or the dimensionless van't Hoff factor
M is the molarity or the concentration of the solution, moles/L
R is the universal gas constant
T is the absolute temperature, degrees Kelvin The Morse equation can be used to calculate each solution's flux potential on each side of the membrane. The difference between the two pressures on either side of the membrane (Δπ), becomes the total pressure of the membrane system. Therefore, the total pressure of the PRO system, Δπ, is equal to $(iMRT)_f - (iMRT)_p$, where f is the feedwater side of the membrane, and p is the permeate side of the membrane. Assuming that each side of the membrane is at the same temperature, and R is constant, $[(RT)_f = (RT)_p]$, then the Morse equation mathematically simplifies to the linear relationship, $\Delta \pi = (iM)_f - (iM)_p$. In other words, the total pressure of the membrane system is proportional to the difference of the concentrations of each of the solutions, times its solute's van't Hoff factor.

In practice, the actual measured osmotic pressure across the membrane is much lower than is described by the Morse Equation, resulting in much lower water flux. The lower than expected water flux rate is attributed to several membrane-related transport phenomena. In particular, two types of concentration polarization (CP) phenomena, concentrative CP and dilutive CP, can take place. Furthermore, concentrative and dilutive CP can each take place both internal and external to the membrane.

Concentrative CP occurs in osmotic systems in which the feedwater is a solution of pure water with a dissolved solute, and the membrane effectively rejects the feedwater solute molecules and ions. As pure water from the feed solution permeates the membrane, there is a buildup of solute material left in the feed solution at the active layer surface. As a result, the feedwater solution becomes more concentrated within close proximity of active layer of the membrane. The increased solute concentration of the feedwater solution, increases its osmotic pressure, and decreases the net osmotic driving force of the membrane system. If solute ions bleed into the either the dense separating layer or the porous support layer of the membrane, the Concentration Polarization is referred to as internal concentrative CP.

If the concentrative CP is extreme, the dissolved ions can precipitate and form a particulate scale on and within the membrane, further reducing mass transfer.

Likewise, on the draw side of the membrane, the pure water permeating the membrane dilutes the draw solution, further reducing the net osmotic pressure of the membrane system. CP is considered one of the most important measures to be taken in order to advance the field of forward osmosis and pressure retarded osmosis.

This invention addresses both concentrative and dilutive CP in a revolutionary manner. First, the feedwater is pure water, and therefore no concentration phenomenon can occur. Second, since the osmotic draw solute consists of superparamagnetic nanoparticles, and their position can be controlled by a permanent magnet, they can be effectively pushed to within close proximity of the membrane. Therefore, the strength of the solenoid-type magnetic field can be selected in order that the nanoparticle can overcome the flow of the incoming permeate. This way, the particles can be effectively positioned near the membrane and be maintained as effective draw solutes.

Third, the membrane can have relatively large pores because its purpose is not to prevent the passage of dissolved ions, it is to prevent the passage of much larger draw solute particles. The pores need only be small enough to prevent the passage of the draw solutes across the membrane. As a result, the membrane with its large pores will have a high permeability constant which will allow a high water flux. The high water flux will enable high electricity generation rates.

For most non-electrolytes dissolved in water, the van't Hoff factor[1] is essentially one. For most ionic compounds dissolved in water, the van't Hoff factor is equal to the number of discrete ions in a formula unit of the substance. Since nanoparticles are not 'dissolved' in water, their van't Hoff factor needs to be accounted for in some other way. Also, nanoparticles need to be chemically treated with a dispersant, a so called surface ligand, to keep them suspended in a stable aqueous suspension. Otherwise, the particle would settle in the water solution, or adhere to and agglomerate with other particles. Researchers Ge[2], et al have approximated the molecular weight of the surface ligands surrounding each magnetic nanoparticle to quantify the osmotic pressure of the draw solution They report that this is appropriate since it is the surface ligands that function to extract, or pull the water across the membrane in the forward osmosis process.

Despite the fact that the Morse equation, the Ge researchers, and nearly all biological texts call the "high" osmotic pressure side of the membrane, the side with high concentration of solute particles, the choice made in this document is the opposite. The rationale for this choice is that the energy which drives the fluid transfer is the thermal, vibrational energy of the water molecules, not the thermal energy of the solute particles, because the solute particles do not contribute to fluid transfer across the membrane due to their size relative to the membrane's pore size. Other source documents describe osmotic pressure, and specifically which side of the membrane to call the "high" osmotic pressure side, as is done here. Researchers at other academic institutions, e.g., Georgia State University[3], also attribute the high pressure side to the pure-water, solvent side of the membrane. In other words, the pure water side of the membrane contains higher energy density because of the higher relative concentration of water molecules. The vibrational energy of the nanoparticles does not contribute to osmotic pressure because they cannot permeate the membrane. The no-energy draw solute nanoparticles volumetrically displace the high-energy water molecules on the draw solution side of the membrane. Van't Hoff factors greater than one as attributed to solutions containing multi-ion formula compounds, have a volumetric explanation for their greater osmotic pressure generation: the dissolved multi-ionic compound takes up more volume, displaces more water, and therefore results in greater osmotic pressure generation. Furthermore, the Morse equation's rationalization of why a solution of multi-ion compounds generates a higher pressure can be explained by the increased volumetric displacement of pure water by the multi-ionic compounds. Multi-ion compounds displace more water than single-ion compounds.

Resistive forces can be applied to this osmotic force. Since the resistive force retards the original osmotic pressure, the phenomenon is called pressure retarded osmosis (PRO). The resistive force can be the performance of mechanical work, such as action upon a hydroturbine generator to create electricity. The resistive force provided by the hydroturbine can be made variable and adaptable so that maximum energy is transferred from the pressurized water stream to the turbine (even with potentially varying osmotic flux performance and resulting changing water pressure) while allowing enough remaining pressure for the water stream to return to the feed side of the pure-water bath. This can be accomplished by configuring the PRO system with multiple (two or more) hydroturbines, of reducing pressure stages, in series, starting with the highest pressure stage and ending with the lowest pressure hydroturbine stage.

The solute particles used in this PRO unit are superparamagnetic nanoparticles. The unique characteristic of a superparamagnetic nanoparticle is that it only exhibits magnetic behavior while it is in a magnetic field. In the absence of an externally applied magnetic field the nanoparticles exhibit neither remanence (the measure of particle's remaining magnetization when magnetic field is zero), nor coercivity (the measure of the reverse field needed for the particle to become demagnetized). When these particles are in a liquid water solution, the solution is called either an aqueous or a water-based ferrofluid.

Since the physical location of the ferrofluid can be controlled by a magnetic field, a ferrofluid is an ideal PRO draw solution. The ferrofluid's presence at the surface of the membrane can be maintained, and thus the particle can be prevented from being swept away from the membrane by the incoming permeate flow. It obviates the need to separate the nanoparticles from the membrane effluent and avoids the need to continuously replace the relative costly ferrofluid. Furthermore, maintaining the ferrofluid inside the membrane with a slight force, reduces the effect of dilutive, concentration polarization, a phenomenon that reduces osmotic pressure and correspondingly, the flux rate and electricity generation potential of the PRO Unit.

The magnetic field shape used in this invention is a solenoid magnetic field. It can either be created with permanent bar magnets placed in a cylinder configuration or with hollow electromagnetic coil. Both permanent solenoid magnets and electromagnetic solenoid magnets are used to repel the superparamagnetic nanoparticles in this PRO invention.

The usual application of pressure retarded osmosis is to desalinate seawater and at the same time produce electricity as taught by Loeb in U.S. Pat. No. 4,193,267, by Al-Jlil in U.S. Pat. No. 8,197,693, and in a hybrid RO/PRO system by Stover, et. al. in U.S. Pat. No. 7,871,522. The key basic characteristics of an osmosis system, in addition to the type of osmosis, are the type and composition of the membrane; and the type and composition of the draw solution. Membranes can either be flat sheet membranes in a plate-and-frame configuration or in a spiral-wound configuration, or could be tubular. In turn, tubular membranes can be either tubes or hollow fibers. Cath et al[4] discuss the advantages of hollow fiber membranes. They point out that hollow fiber membranes can support high hydraulic pressure without deforming and can be easily packed in bundles directly within a holding vessel. They are also relatively easy to fabricate in modular form. Also, they allow liquids to flow freely on the feed side of the membrane. Other advantages of hollow fiber membranes are they are much cheaper to manufacture and they can have several hundred times the surface area per unit volume than flat sheet or spiral wound membranes. In U.S. patent application Ser. No. 13/987,129, Aylesworth teaches the use of a PRO system using hollow fiber membranes for producing electricity for more general stationary applications than concurrent desalination.

A variety of compositions can be used for the draw solution. In an early commercial application of forward osmosis (FO), Wickenden in U.S. Pat. No. 2,116,920 teaches the use of calcium chloride as a draw solution in the concentration of fruit juices. In another early patent, Batchelder in U.S. Pat. No. 3,171,799 teaches the use of a volatile solute, such as sulfur dioxide, in a draw solution for the demineralization of water. Recently interest in draw solutions has centered on those containing magnetic nanoparticles. Magnetic particles in the draw solution have the advantage of being readily separated from the product water of a purification or desalination process with use of magnetic fields. They can also be readily recycled back into the draw solution. A kind of nanoparticles that is currently of interest is a material referred to as magnetoferritins. As Oriard et al describe in US 2007/0278153, it is magnetite bound to a protein such as ferritin wherein the magnetite is the core and the protein is the spherical cover. The use of magnetite nanoparticles is also taught by Etemad et al in US 2010/0051557 in the context of removing heavy metals from aqueous media by means of adsorption and magnetic capturing. Etemad et al mention that the magnetite is superparamagnetic but does not indicate whether they are coated with a protein. Superparamagnetic iron oxide nanoparticles (SPIONs) are also the subject of intense research for various biomedical applications as described by Latorre et al[5].

An increase in feedwater temperature in an osmotically driven process can increase the flux considerably. Kim and Elimelech[6] report that an increase in feedwater temperature from 20° to 30° C., (from 68° to 86° F.) will result in an increase in water flux of 50.5%, from 9.23 to 13.89 L/m$^2$h, for a resulting power density increase of 46.6%, from 3.22 to 4.72 W/m$^2$

SUMMARY OF THE INVENTION

This invention is an onboard pressure retarded osmosis unit for charging or recharging the battery of an electric conveyance or for feeding the conveyance's motor directly. A significant challenge to the public acceptance of electrically powered vehicles is the long time required for recharging the vehicle's battery. There are currently three basic charging levels that correspond to the different Electric Vehicle Charge Equipment (EVSE) systems. An alternating current (AC) Level 1 charger uses a common household 120 volt (V) AC plug and can provide 2 to 5 miles of vehicle range per hour of charging. A Level 2 EVSE offers charging with 240 V AC electrical service and can provide 10 to 20 miles of range per hour of charge time. Direct Current Fast-Charging equipment (which typically uses 480 V AC input) can provide a light-duty plug-in electric vehicle or all-electric vehicle 60 to 80 miles of range in 20 minutes. Compared to the relative short time required to fuel an internal combustion engine powered vehicle, these relatively long charge times limit public acceptance and EV market penetration. In addition, the anxiety caused by running out of EV battery power away from the nearest charge station also prevents or inhibits market acceptance. The instant invention by providing the capability to charge the battery whether or not the vehicle is being driven, is expected to increase market acceptability of electric vehicles.

It is envisioned the PRO Unit would be used in an electric vehicle that has a battery/frame chassis in a flat configuration. The PRO Unit consists of multiple (approximately 20 to 40) PRO Cells (each one of which measures approximately 3 to 4 feet long, 4 inches wide, and 2 inches tall) placed side-by-side in a flat configuration above and/or below the battery deck. Each PRO Cell consists of a water-tight enclosed center-section, with identical, 4 to 6 inch long end caps on each end. The end caps contain a series of one or more hydroturbines, a permanent solenoid-type magnet assembly, a turn-around tube, and a nanoparticle removal tube.

The PRO Cell's water-tight center section contains two hollow fiber membrane bundles, submerged in pure water. The hollow fiber membranes are perforated (or contain pores) and have in their interiors a draw solution consisting of SPIONs. The membrane bundles are oriented side-by-side, so that the direction of their permeate flow is opposite to one another. The advantage of having each neighboring membrane bundle's permeate flow in the opposite direction is for each to benefit from the increased force from the neighboring magnetic field. To show this beneficial effect, FIG. 1 shows two identical iron core magnets, with the one on the right an inverted image of the one on the left. I represents current and B represents lines of flux If the images were closer together, as the membrane bundles would be in the PRO Cell, each magnet's outside lines of flux is in the same direction as its neighbor's desired inside lines of flux. As the electromagnets are energized, their magnetic lines of flux assist each other.

The primary object of the instant invention is to provide an on-board means to charge the battery of an electric vehicle to reduce charging times and thereby improve the public acceptance of electric vehicles. Another object of the invention is to provide an on-board means of providing DC electricity directly the vehicle's motor.

For PRO to have a practical application as a source of power for an electric vehicle, it must supply sufficient power. Twenty five example PRO Units, (the number of PRO Units estimated to fit side-by-side on the top deck of an electric vehicle chassis) could generate more electricity than would be used by an electric vehicle during a 20-mile one-way commute. The national average one-way commute distance is 20 miles, which would require an EV approximately 6.7 kWh, (using 3 miles per kWh). The PRO unit can generate this in less than 4 hours. The significance of this is that the average person could commute to work in the morning and their car could recharge itself to a fully charged state, autonomously, before lunchtime. Older electric vehicles have energy efficiencies of about 2 miles per kWh, while some electric vehicles such as GM's EV1, had energy efficiencies of over 6 miles per kWh. (http://avt.intel.gov/pdf/fsev/costs.pdf) Any surplus electricity generated by the PRO unit could be fed back into the electrical grid.

BRIEF DESCRIPTION OF THE SEVERAL VIEWS

DETAILED DESCRIPTION OF THE INVENTION

Figure 2:
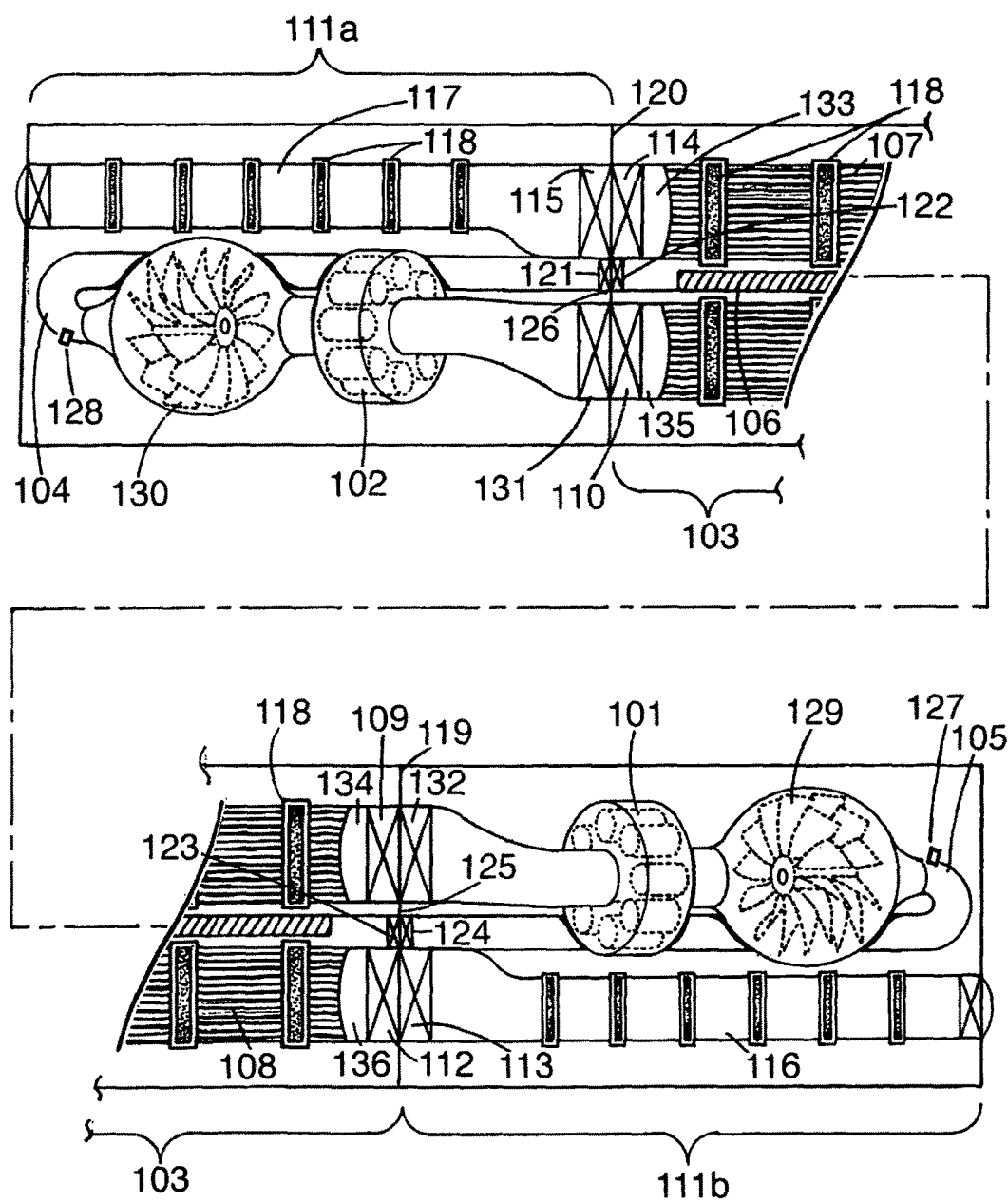
FIG. 2 is a view of a PRO cell that has solenoid-type permanent magnets between the hydroturbines and the membrane bundles
Figure 3:
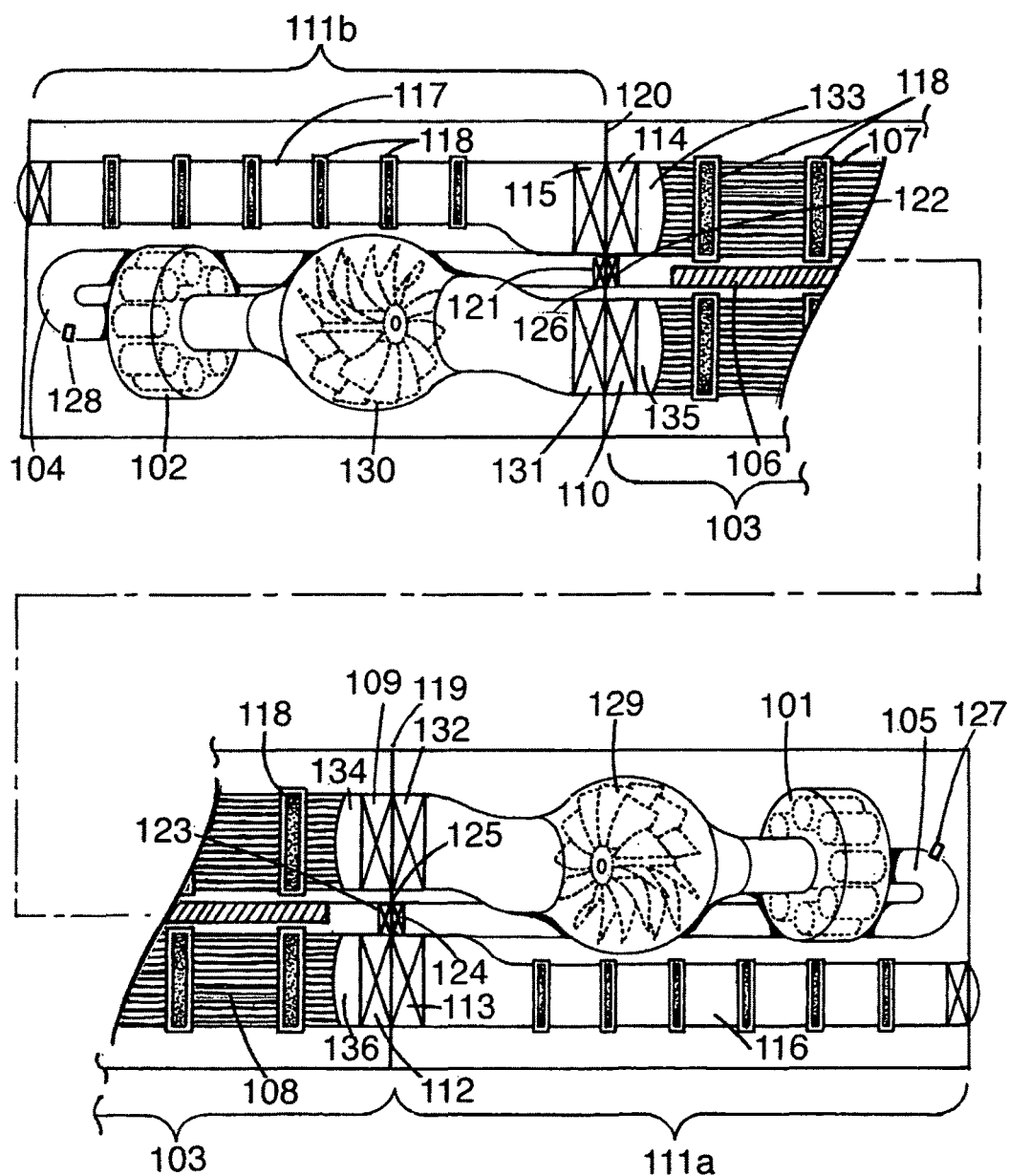
FIG. 3 is a view of a PRO cell that has hydroturbines between the membrane bundles and the permanent solenoid magnets.

FIG. 2 and FIG. 3 each show a PRO cell for use with a vehicle with a battery/frame chassis, such as a Tesla® Model S. Each PRO cell consists of a water-tight center-section 103 containing two hollow fiber membrane bundles 107 and 108. On either side of the water-tight center-section are identical end caps 111a and 111b. Each membrane bundle is adjacent to an end cap and connected to a ferrofluid isolation tube 116 and 117, and an end cap with a solenoid-type permanent magnet assemblies, 101 and 102, a series of hydroturbines 129 and 130, and a turn-around tube, 104 and 105. Thereby each membrane bundle within the water-tight enclosure is adjacent to an end cap connected to an isolation tube at one end, and an end cap with a series of hydroturbines, a permanent magnet and a turn-around tube within the end cap on the other end. The water-filled center section can be approximately 3½ to 3¾ feet long and the end caps could be 4 to 6 inch long.

Each membrane bundle in the center section contains a large number, typically 500 to 1,000, hollow fiber membrane strands grouped together and sealed into a socket on either end of the water-tight enclosure 133 and 134 for membrane bundle 107, and sockets 135 and 136 for membrane bundle 108. Sockets 133 and 135 fit into left-hand center section bulkhead 120 and sockets 134 and 136 fit into right-hand center section bulkhead 119, such that the fiber lumen, the inside of the hollow fiber, is open to the inside of the membrane socket. The pure water solvent on the outside of the hollow fibers is prevented from leaking into the inside of a hollow fiber membrane strand.

The most common materials for use as hollow fiber membranes owing to their competitive performance and economic characteristics are cellulose acetates, nitrates, and esters (CA, CN, and CE), polysulfone (PS), polyether sulfone (PES), polyacrilonitrile (PAN), polyamide, polyimide, polyethylene and polypropylene (PE and PP), polytetrafluoroethylene (PTFE), polyvinylidene fluoride (PVDF), polyvinylchloride (PVC).

Each membrane bundle is submerged in a nearly pure water bath on the outside of the hollow fiber strands. The hollow fiber tubes are small with an inside diameter in the range of 10 to 100 microns (a micron is one-millionth of a meter) and an outside diameter in the range of 25 to 200 microns. Smaller diameter hollow fiber tubes are preferred to larger diameter fiber tubes by having more membrane surface area per unit volume of membrane. The pore size of the hollow fibers can range from 0.0001 to 0.1 microns. The fiber lumens contain a highly concentrated, colloidal draw solution of superparamagnetic nanoparticles. Paramagnetism describes the characteristic that the nanoparticles are magnetic only while within an externally applied magnetic field and show no such magnetic characteristic absent the magnetic field. Therefore, the particles would not show a magnetic attraction to each other, but rather only in the direction of an external magnetic force field. The prefix 'super' in superparamagnetic refers to the nanoparticle's strength of magnetization and that it is many times greater than the magnetization of an ordinary paramagnetic particle. Superparamagnetism occurs when the nanoparticle is sufficiently small (approximately 10 nm) so that the surface area is large relative to the particle's mass. However, the size of the nanoparticles must be greater that the size of the pores in the hollow fiber tubes to prevent nanoparticles from drifting out through the pores.

The pure water solvent can, however, pass from the outside of the hollow fiber through its tiny pores to the inside of a fiber strand owing to the osmotic pressure created by a highly concentrated, colloidal draw solution of superparamagnetic nanoparticle inside the hollow fiber tubes. As water permeates a membrane, the volume and pressure of the water/draw solution on the inside of the hollow fiber membrane increases.

The types of superparamagnetic nanoparticles that are preferred have an iron oxide core with a shell that prevents the iron oxide from oxidizing. One such shell material is silica. These are called superparamagnetic iron oxide nanoparticles, or SPIONs. Some of the other materials used to make the core of the particle superparamagnetic are pure metals such as Fe, Ni and Co, and alloys such as $Fe_3O_4$, $Fe_2O_3$, $MgFe_2O_4$, $MnFe_2O_4$, $CoFe_2O_4$, $CoPt_3$, FePt, $FePt_3$ and CoO. The silica shell around the SPION provides it with chemical stability by preventing the iron oxide core (preferably magnetite [$Fe_3O_4$], or maghemite [$Fe_2O_3$]), from oxidizing, preventing them from agglomerating, or sticking to a neighboring particle and acting as a base that a functionalizing chemical dispersant coating can adhere to. Other inorganic shell materials of the core-shell nanoparticle include carbon, precious metals such as silver and gold, or their oxides, which can be created by gentle oxidation of the outer shell of the nanoparticles, or additionally deposited, such as $Y_2O_3$ (Yttrium oxide).

Chemical dispersants, also called surface ligands, capping agents, or polymers, are used to 'functionalize' the nanoparticle and thus allow for it to be maintained in a stable suspension. In general, surfactants or polymers can be chemically anchored or physically adsorbed on magnetic nanoparticles, which creates repulsive forces (mainly as steric repulsion) to balance the magnetic and the van der Waals attractive forces acting on the nanoparticles. Thus, by steric repulsion, the magnetic particles are stabilized in suspension. When forming a stable, colloidal suspension, the nanoparticles are referred to as dissolved or hydrophilic. Polymers containing functional groups, such as carboxylic acids, phosphates, and sulfates, can bind to the surface of the nanoparticle. Suitable polymers for coating include Fe(acac)$_3$+2-pyrrolidone, Fe(acac)$_3$+triethylene glycol, Fe(acac)$_3$+triethylene glycol+polyacrylic acid, poly(pyrrole), poly(aniline), poly(alkylcyanoacrylates), poly(methylidene malonate), and polyesters, such as poly(lactic acid), poly(glycolic acid), poly(e-caprolactone), and their copolymers.

There are two preferred embodiments. They differ in the relative location of solenoid type permanent magnet 101 or 102 and a series of hydroturbines 129 or 130 in which electricity is generated. In the embodiment shown in FIG. 2, the solenoid-type permanent magnets are between the membrane bundles and hydroturbines. Conversely, in the embodiment shown in FIG. 3, the hydroturbines are between the membrane bundle and the solenoid-type permanent magnets.

If the water flow goes to the hydroturbine first (as in FIG. 3), there would be greater water/ferrofluid pressure (along with the added mass of the nanoparticles) acting upon the hydroturbine, thus having the potential to produce more electricity. This is because the ferrofluid's pressure and velocity, which represents approximately 30 to 40% of the mass and volume of the solution, would be greater since the magnetic field would not have halted the momentum of the magnetic particles.

Conversely, if the water/ferrofluid solution approaches the magnetic field first (as in FIG. 2) the magnetic field would be closer to the membrane. If the field is closer, there would be a lower volume of ferrofluid, which could result in a greater force on the nanoparticles being pushed against the membrane, providing a more effective draw solution. The nanoparticles within the hollow fibers (near the active membrane surface area) would be outside the effective range of the magnetic field. However, they would still be pushed against the membrane due to the inter-particle repulsion from particles in the magnetic field. This occurs from particle-to-particle, throughout the distance from the magnetic field to the active surface area of the membrane. The inter-particle repulsion is the result of the chemical dispersant, or nanoparticle capping agents, which provides the colloidal suspension its stability. This inter-particle electrochemical repulsion exhibits a squishy, elastic, spongy characteristic between the nanoparticles, and as such is compressible. Reducing the magnet-to-membrane distance would reduce the compressibility of the ferrofluid, allowing for the magnetic field to transfer more of its force to the nanoparticles to maintain the particle at the surface of the membrane.

As the pressurized water, for the configuration shown in FIG. 2, (or the pressurized ferrofluid/water solution, for the configuration shown in FIG. 3) passes through the series of hydroturbines 129 or 130, it acts upon the turbine blades and gives up its dynamic energy. Upon completing its flow through the series of hydroturbines, the water or water/ferrofluid solution is nearly completely depressurized.

The draw solution, which has picked up water in the permeation process in a membrane bundle and become pressurized, is depressurized in passing through the series of hydroturbines and the solenoid-type permanent magnet prevents the superparamagnetic particles from passing out of the end cap. Hence only relatively pure water leaves end cap 111a or 111b and enters a turnaround tube 104 or 105.

Immediately after the hydroturbine/permanent magnet, the turnaround tube makes a 180° turn 105 on the right side to reverse the direction of the flow of water. This tube then enters the center section 103 and its contents are returned to the water bath on the outside of the hollow fibers in the membrane bundles after passing through a water return end cap isolation valve 124 and water return center section isolation valve 123. On the right side, between the water return isolation valves is the water return bulkhead fitting port 125.

Figure 1:
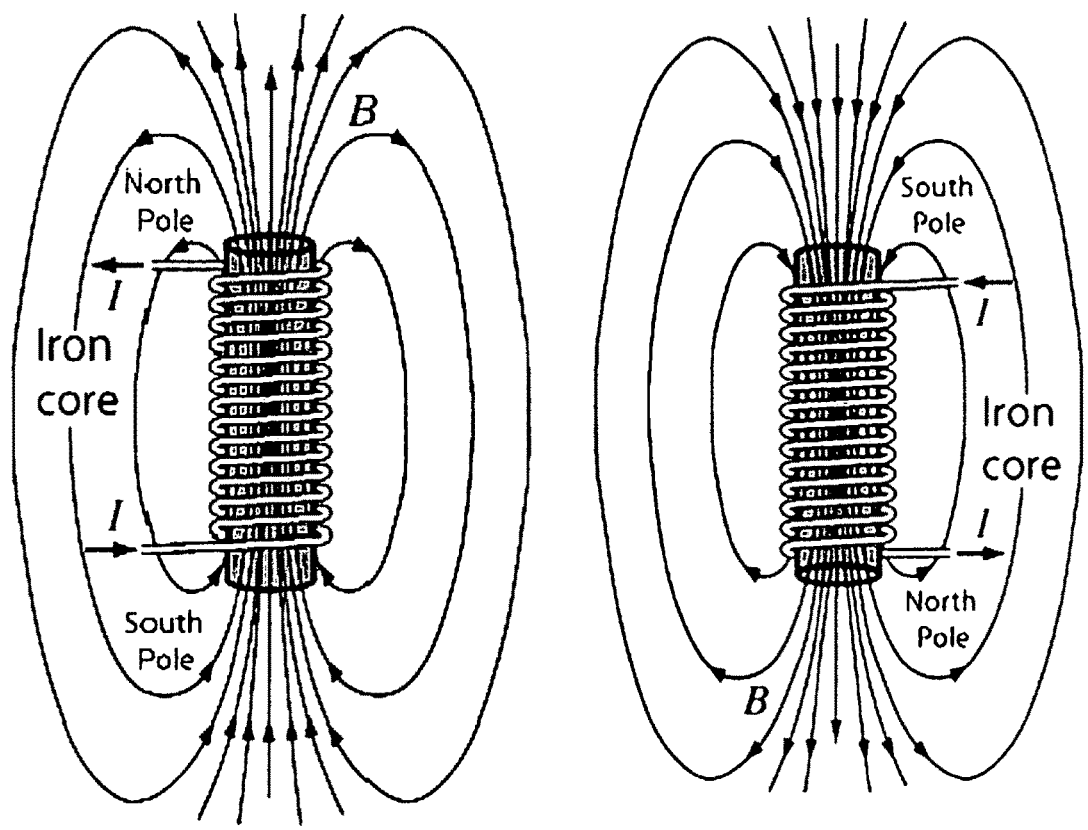
FIG. 1 shows magnetic field lines of flux when two fields are oriented in opposite directions of one another.

In the first bundle 107, the pressurized draw solution/permeate flow leaves the center section through membrane strand socket 134, membrane isolation valve 109, and end cap isolation valve 132 before encountering solenoid-type permanent magnet 101, series of hydroturbines 129, and turn-around tube 105 before being returned to the water bath on the outside of the hollow fibers in the membrane bundles after passing through water return end cap isolation valve 124 and water return center section isolation valve 123. In the second bundle 108, the pressurized draw solution/permeate flow leaves the center section through membrane strand socket 135, membrane isolation valve 110, and end cap isolation valve 131 before encountering solenoid-type permanent magnet 102, series of hydroturbines 130, and turn-around tube 104 before being returned to the water bath on the outside of the hollow fibers in the membrane bundles after passing through water return end cap isolation valve 121 and water return center section isolation valve 122. An important characteristic of a PRO Cell is that the flow of the draw solution/permeate in the two membrane bundles are in opposite directions. The advantage of having each neighboring membrane bundle's permeate flow in the opposite direction is for each to benefit from the increased force from the neighboring magnetic field. FIG. 1 shows this beneficial effect, it shows two identical figures, with the one on the right an inverted image of the one on the left. If the images were closer together, as the membrane bundles would be in the PRO Cell, each magnet's outside lines of flux is in the same direction as its neighbor's desired inside lines of flux. As the electromagnets are energized, their magnetic lines of flux assist each other. If the direction of permeate flow of the neighboring membrane bundles was the same, then each bundle's magnetic field would interfere and be counterproductive to its neighbor's intended flow direction.

Each membrane bundle has plural solenoid-type electromagnet bands 118. As the draw solution contains superparamagnetic nanoparticles, activation of the electromagnet bands causes movement of the hydrated draw solution so that it leaves membrane bundles (107 and/or 108) through respective membrane strand sockets (133, 136), membrane isolation valves (114, 112) and a bulkhead (120 and 125) between the center section 103 and respective end caps. Electromagnetic bands 118 not only surround the hollow fiber membrane bundles in the center section 103 but are present in ferrofluid isolation tubes 116 and 117. The nanoparticle isolation tubes provide a capability to evacuate ferrofluid from the hollow fiber membrane bundles during shutdown conditions or when otherwise needed. Ferrofluid can be moved from the central section to the nanoparticle isolation tubes by activating the electromagnetic bands and opening wet membrane isolation valves 112 and 114, and dry membrane isolation valves 113 and 115. Moving the ferrofluid from the ferrofluid isolation tubes back into the hollow fiber membrane tubes, can be accomplished by energizing the electromagnets under reverse polarity.

As discussed earlier, it has been found that an increase in feedwater temperature increases water flux and power density. In addition, heating is necessary to provide freeze protection to the PRO Cell water when operated in cold weather climates. An electric-powered water heater 106 is energized by the batteries charged by the PRO system. The electric water heater is placed within the water-tight enclosed center section on a rigid lattice frame that is attached to the electromagnets 118 and both opposite ends of the inside of the water-tight enclosure 103. This electric heater could be controlled by thermostat and temperature probes 127 and 128. The temperature probes can be located either in the water-tight compartment or within the end-caps (as shown in FIGS. 2 and 3). Since this PRO system is a closed system with no significant material input or output, it is economically feasible to control its temperature above ambient temperature. To maximize the return on investment of the cost of increasing the temperature, the PRO Cell Unit could be clad with thermal insulation around its outside surfaces (thermal insulation is not applied to inner, shared surfaces between PRO Cell Units).

Figure 4:
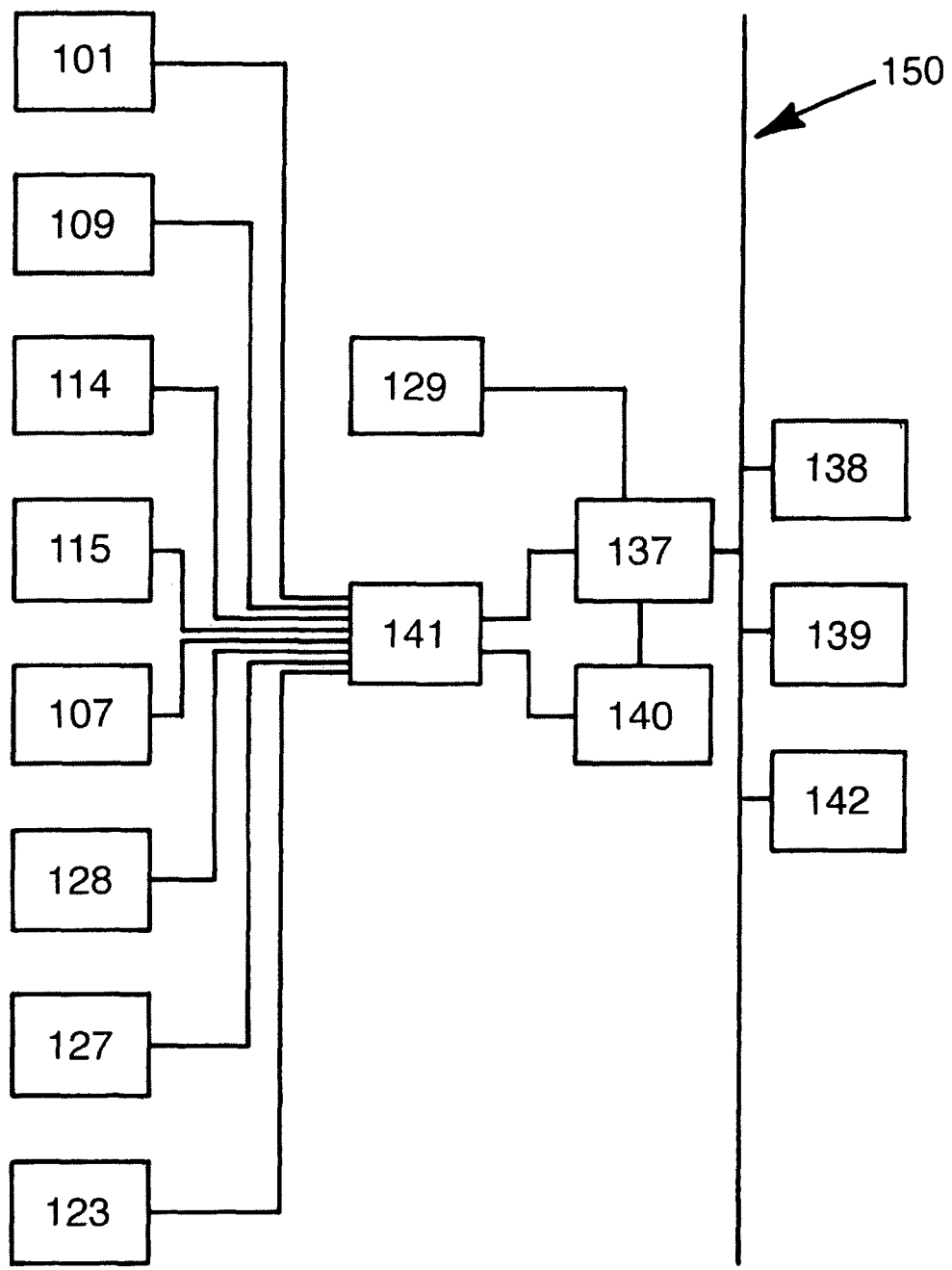
FIG. 4 shows a simplified view of a PRO cell's electrical output and control system and its interface with a vehicles electric propulsion system.

FIG. 4 is a simplified image of a PRO Cell's electrical control system and its interface with the vehicle's electrical system. Each membrane bundle has individual control components (micro control system) that control activation of electromagnetic bands, the direction of flow of ferrofluid, opening and closing of isolation valves, operation of the water heater and provision of electricity to the vehicle's electrical system. Each micro control system connects individually to an electrical bus 150 where it interfaces with the vehicle's electrical system components, the battery or capacitance device 138, vehicle drive motor 139, and connection to the electrical power grid, or other peripheral electrical device 142.

The brain of the micro control system is the control signal/power connector controller 141. It consists of a network of signal and power connections to all of the isolation valves, the electromagnets that act as both the hollow fiber membrane bundle bands and that band nanoparticle isolation tubes 116 and 117, and the water heater. This controller connects to the following components within a PRO Cell to control its operation. It interprets temperature readings from temperature probes 127 and 128 to control the water heater 106 through the amount of direct current it applies to the water heater's elements to reach a desired ferrofluid temperature. It controls membrane isolation valves 109 and 110 between the end caps 111a and 111b, and the center section 103. It controls the membrane isolation valves between the center section and the nanoparticle isolation tubes 112-115 when it is decided to remove the ferrofluid from the center section and move the ferrofluid to the isolation tubes 116 and 117, or to return the ferrofluid when the PRO Cell is being powered up. It controls end cap isolation valves 131 and 132 should it be decided to isolate the end caps for end cap removal.

In a conventional electric vehicle, the vehicle's drive motors 139 are connected to a battery/capacitance device 138 for their energy source. In this PRO hybrid electric system, there is an electric hybrid charge controller 137 associated with each membrane bundle. This device receives electrical energy generated in the hydroturbines 129 or 130 and distributes it to the battery/capacitance device or vehicle' drive motors 139 through bus 150 as directed by the control signal/power connection controllers 141 to either the vehicle's battery/capacitance device or vehicle drive motors. Also on bus 150 is a connection to the electricity power grid or other peripheral electrical device 142. The PRO unit also has a mechanism for preparing it for shutdown. A ferrofluid-membrane removal module 140 in conjunction with the control signal/power connection controller controls the opening and closing of membrane isolation valves 109 and 110, energizes electromagnets 118, and isolates the water heater from its power source so that the ferrofluid can be isolated in nanoparticle isolation tubes 116 and 117 prior to shut-down.

I claim:

1. An onboard pressure retarded osmosis (PRO) unit for producing an alternative source of electricity for an electric conveyance with battery/capacitors and drive motors comprising:

an array of PRO cells, each cell comprising a water-tight center section compartment, each compartments containing two membrane bundles, each bundle containing multiple semi-permeable hollow fiber membrane strands with pores and containing superparamagnetic nanoparticles in a draw solution, pure water outside the membrane bundles but capable of permeating the hollow fiber strands;

an end cap on either side of the water-tight center section, the end cap containing a series of hydro turbines that produce electricity and magnet assemblies, the magnets preventing further passage of the superparamagnetic nanoparticles, each end cap terminating in a turn-around tube containing pure water after separation of the superparamagnetic nanoparticle, the turn-around tube reentering the center section, a nanoparticle isolation tube separated from each membrane bundle by at least one isolation valve, the nanoparticle isolation tube and the center section compartment being contained within bands of electromagnets, the magnetic fields of the bands of electromagnets for the center section compartments being oriented to reinforce each other, and valves isolating the center section from the end cap;

a power signal/power connection controller that controls operation of the electromagnet bands around the nanoparticle isolation tubes and the center section compartments, the opening and closing of the isolation valves between a center section compartment and its end caps, and between a center section compartment and its nanoparticle isolation tubes; and a hybrid charge controller for directing electricity produced in the hydroturbines to either the battery/capacitors, or the vehicle drive motors; and a superparamagnetic nanoparticle removal module.

2. An onboard pressure retarded osmosis (PRO) unit as set forth in claim 1 wherein there is a power signal/power connection controller and a hybrid charge controller for each membrane bundle.

3. An onboard pressure retarded osmosis (PRO) unit as set forth in claim 1, further comprising a water heater between membrane bundles of a PRO cell, the water heater being controlled by the control signal/power connection controller with input from temperature probes.

4. An onboard pressure retarded osmosis (PRO) unit as set forth in claim 3 wherein the electromagnet bands around the nanoparticle isolation tubes and around the center section compartments are solenoid electromagnets.

5. An onboard pressure retarded osmosis (PRO) unit as set forth in claim 4 wherein the hollow fiber tubes are made of a material selected from the group consisting of cellulose acetates, nitrates, and esters (CA, CN, and CE), polysulfone (PS), polyether sulfone (PES), polyacrilonitrile (PAN), polyimide, polyimide, polyethylene and polypropylene (PE and PP), polytetrafluoroethylene (PTFE), polyvinylidene fluoride (PVDF), polyvinylchloride (PVC).

6. An onboard pressure retarded osmosis (PRO) unit as set forth in claim 5 wherein the superparamagnetic particles in the draw solution have an iron oxide core and a silica shell.

7. An onboard pressure retarded osmosis (PRO) unit as set forth in claim 6 wherein the superparamagnetic particles in the draw solution are coated with a surface ligand.

\* \* \* \* \*